Oct. 3, 1961 H. L. KURKJIAN ET AL 3,003,137
BINARY SIGNAL STORAGE
Filed Nov. 7, 1955
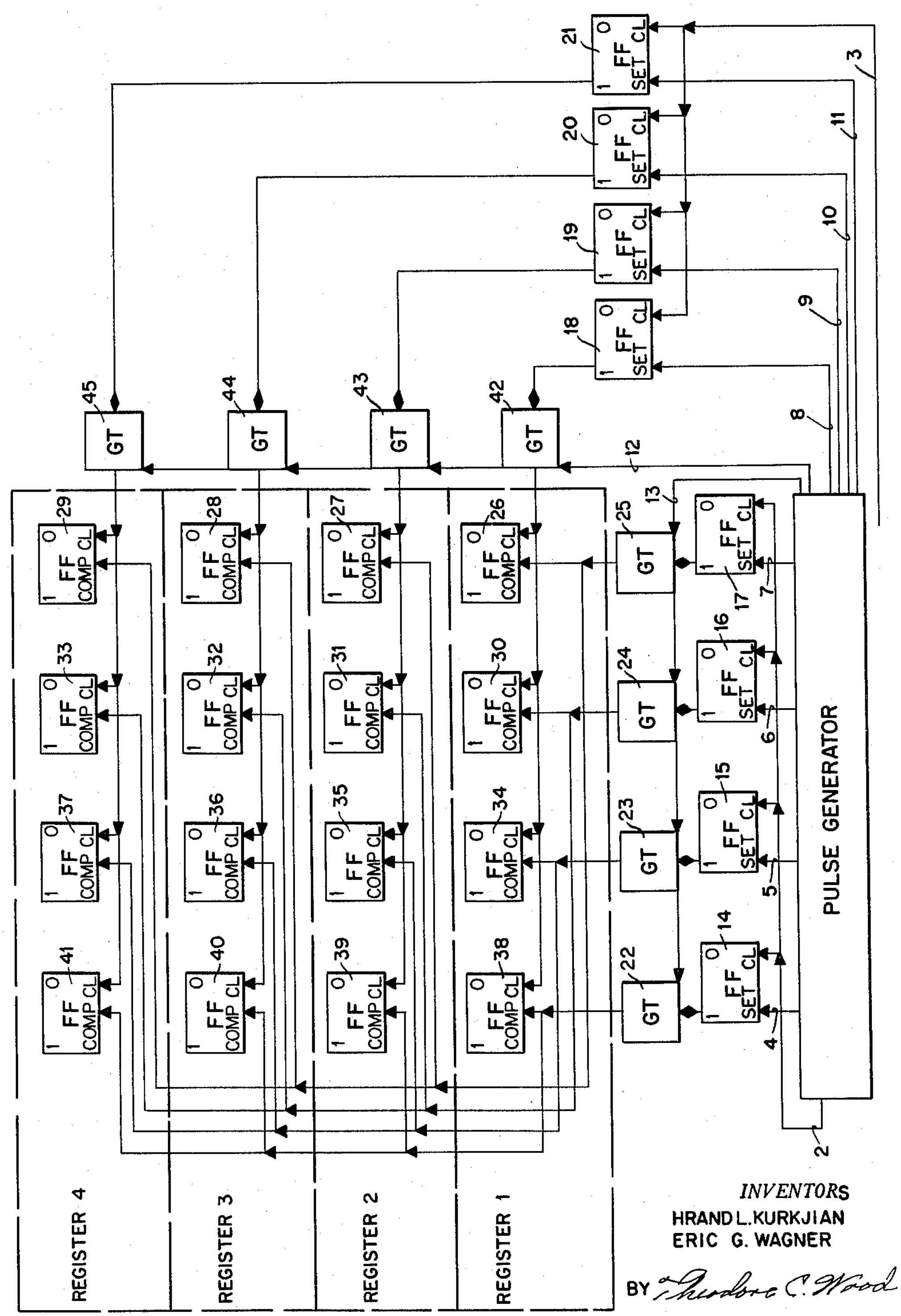
INVENTORS
HRAND L. KURKJIAN
ERIC G. WAGNER
BY Theodore C. Wood
AGENT 3,003,137
BINARY SIGNAL STORAGE

Hrand L. Kurkjian, Hyde Park, N.Y., and Eric G. Wagner, United States Army, assignors to International Business Machines Corporation, New York, N.Y., a corporation of New York Filed Nov. 7, 1955, Ser. No. 545,431
6 Claims. (Cl. 340—172.5)

This invention relates to signal storage systems and more particularly to signal storage systems for storing signals in a selected one of a plurality of storage registers.

Various arrangements have been proposed for storing binary signals in a selected one of a plurality of signal storage registers. One of the most common of those previously proposed arrangements provides for selectively gating the signals to be stored, to the input of the desired register. Selective gating arrangements have the disadvantage that separate gating circuits must be provided for each of the registers into which the signals may be stored and selection means must be provided to condition the one gating circuit which is associated with the register into which the signals are to be stored.

In accordance with the principles of this invention, binary signals to be stored are applied to the complement input of the various flip-flop storage devices in each of the registers; then the particular register, into which it is desired to store the signals, is cleared, and finally the binary signals to be stored are again applied to the complement input of the various flip-flop storage devices in each of the registers. At the completion of this sequence of operations, the one register, into which it is desired to store the binary signals, will contain those signals whereas the remaining registers will contain the signals which were stored therein before the sequence of operations was begun.

It is an object of this invention to provide an improved signal storage system which permits signals to be stored in a selected one of a plurality of registers.

It is a further object of this invention to provide an improved signal storage system which employs means for selectively clearing one of a plurality of registers and means for simultaneously applying signals, to be stored, to the complement input of a plurality of storage registers.

It is a still further object of this invention to provide an improved signal storage system wherein means are provided to simultaneously apply signals to be stored to the complement input of each of a plurality of storage registers, and means are provided to selectively clear one of said plurality of registers, whereby when it is desired to store signals in a particular one of said plurality of registers, those signals are applied to the complement input of all of said plurality of registers, said particular one of said plurality of registers is cleared and then those signals are again applied to the complement input of all of said plurality of registers.

Other objects of the invention will be pointed out in the following description and claims and illustrated in the accompanying drawings, which disclose, by way of example, the principle of the invention and the best mode, which has been contemplated, of applying that principle.

In the drawings the figure is a logical block schematic diagram of a signal storage system constructed in accordance with the principles of this invention.

*Conventions employed*

In the block diagram figure of the drawing, a conventional filled-in arrowhead is employed on lines throughout the drawing to indicate (1) a circuit connection, (2) energization with standard pulses, and (3) the direction of pulse travel which is also the direction of control. A diamond-shaped arrowhead indicates (1) a circuit connection and (2) energization with a D.C. level. The D.C. levels are on the order of 10 volts when positive and 30 volts when negative, whereas standard pulses are positive 1/10 mircosecond, half-sine 20 to 40 volts. The input and output lines of the block symbols are connected to the most convenient side of the block. An input line to a corner of a block symbol and an output line from the adjacent corner of that block symbol indicates that the pulses are applied to the input of the circuit represented by the block and the input conductor is electrically connected to the output conductor of the adjacent corner.

In the illustrated embodiment of this invention, the basic bi-stable circuit is called a flip-flop. A flip-flop may have three input terminals labeled Set, Clear and Complement and two output terminals labeled One and Zero. A pulse applied to the Clear input terminal of the flip-flop causes the flip-flop to assume its binary Zero state, that is, a stable state which results in positive 10 volts being applied to its Zero output and negative 30 volts being applied to its One output. A pulse applied to Set input terminal of the flip-flop causes the flip-flop to assume its binary One state, that is, a stable state which results in positive 10 volts being applied to its One output and negative 30 volts being applied to its Zero output. A pulse applied to the Complement input terminal causes the flip-flop to assume a stable state which is opposite to the stable state that it was in prior to the receipt of the pulse. A group of flip-flops, one for each order of a binary number to be stored therein, is herein called a register.

*Description of signal storage system*

Reference is now made to FIG. 1 which illustrates in logical block schematic form, a signal storage system constructed in accordance with the principles of this invention. The pulse generator 1 is any suitable equipment for producing the following signals:

(1) A clear pulse on conductor 2, (2) a clear pulse on conductor 3, (3) pulses on conductors 4 through 7 representative of the binary signals to be stored, (4) pulses on conductors 8 through 11 representative of the particular register of the storage system into which signals are to be stored, (5) a gate sample pulse on conductor 12, and (6) a gate sample pulse on conductor 13.

A clear pulse on conductor 2 causes each of the flip-flops 14 through 17 to be cleared. A clear pulse on conductor 3 causes each of the flip-flops 18 through 21 to be cleared.

A pulse on one or more of the conductors 4 through 7 causes the flip-flop of flip-flops 14 through 17, associated with the conductor having the pulse, to be set in its binary One state.

A pulse on one or more of the conductors 8 through 11 causes the flip-flop of flip-flops 18 through 21, associated with the conductor having the pulse, to be set in its binary One state.

Each of the flip-flops 14 through 17, when in its binary One state, causes its corresponding gate of gates 22 through 25 to be conditioned to pass a gate sample pulse received on conductor 13.

The output of gate 25 is applied to the complement input of each of flip-flops 26 through 29. The output of gate 24 is applied to the complement input of flip-flops 30 through 33, the output of gate 23 is applied to the complement input of flip-flops 34 through 37 and the output of gate 22 is applied to the complement input of flip-flops 38 through 41.

Each of the flip-flops 18 through 21, when in its binary One state, causes its corresponding gate of gates 42 through 45 to be conditioned to pass a gate sample pulse received on conductor 12.

The output of gate 42 is applied to the clear input of flip-flops 26, 30, 34 and 38; the output of gate 43 is applied to the clear input of flip-flops 27, 31, 35 and 39; the output of gate 44 is applied to the clear input of flip-flops 28, 32, 36 and 40; and the output of gate 45 is applied to the clear input of flip-flops 29, 33, 37 and 41.

For the purpose of simplifying the description of operation, flip-flops 26 through 41 can be considered as being grouped into four separate registers indicated in FIG. 1.

In the operation of the signal storage system of FIG. 1, pulses are applied to conductors 2 and 3 to insure that flip-flops 14 through 17 and 18 through 21 are cleared, that is, all of those flip-flops are in their binary Zero state.

Pulses are then delivered to the conductors 4 through 7 and 8 through 11. A pulse on a given conductor can be considered as a binary One and no pulse on a given conductor can be considered as a binary Zero. The combination of pulses and no pulses on conductors 4 through 7 is representative of the binary signals to be stored, whereas the combination of pulses and no pulses on conductors 8 through 11 can be considered as indicating which of the registers those binary signals on conductors 4 through 7 are to be stored in.

A pulse is then applied to conductor 13 which will be passed by any one or more of the gates 22 through 25 which are conditioned by their respective flip-flops 14 through 17. A pulse passed by gate 22 will cause flip-flops 38 through 41 to be complemented, a pulse passed by gate 23 will cause flip-flops 34 through 37 to be complemented, a pulse passed by gate 24 will cause flip-flops 30 through 33 to be complemented, and a pulse passed by gate 25 will cause flip-flops 26 through 29 to be complemented.

A pulse is then applied to conductor 12 and this pulse will be padded by the gate of gates 42 through 45 which is conditioned by its corresponding flip-flop of flip-flops 18 through 21. A pulse passed by 42, 43, 44 or 45 will cause the flip-flops of register No. 1, register No. 2, register No. 3 or register No. 4, respectively, to be cleared.

The final operation is effected by applying another pulse to conductor 13 which will result in complementing the various flips-flops 26 through 41 as above described.

To more specifically describe the above operation, it will be assumed that it is desired to store the binary number 1011 in register No. 2, and the various flip-flops are initially in the stable states indicated in the following table:

| Flip-Flops | Initial States | Step 1 | Step 2 | Step 3 | Step 4 | Step 5 |
|---|---|---|---|---|---|---|
| 14 through 17 | 0011 | 0000 | 1011 | 1011 | 1011 | 1011 |
| 18 through 21 | 0010 | 0000 | 0100 | 0100 | 0100 | 0100 |
| Reg. No. 1 | 1100 | 1100 | 1100 | 0111 | 0111 | 1100 |
| Reg. No. 2 | 0101 | 0101 | 0101 | 1110 | 0000 | 1011 |
| Reg. No. 3 | 0011 | 0011 | 0011 | 1000 | 1000 | 0011 |
| Reg. No. 4 | 0110 | 0110 | 0110 | 1101 | 1101 | 0110 |

Step 1, which includes applying a pulse to conductors 2 and 3, causes flip-flops 14 through 21 to be cleared.

Step 2, which includes applying pulse, no pulse combination 1011 to the conductors 4 through 7 and pulse, no pulse combination 0100 to conductors 8 through 11, causes flip-flops 14 through 17 to be set to their binary states 1011, respectively, and flip-flops 18 through 21 to be set to their binary states 0100, respectively.

Step 3, which includes applying a pulse to conductor 13, causes flip-flops 38 through 41, flip-flops 30 through 33 and flip-flops 26 through 29 to be complemented.

Step 4, which includes applying a pulse to conductor 12, causes the flip-flops of register No. 2 to be cleared.

Step 5, which includes applying a pulse to conductor 13, causes flip-flops 38 through 41, flip-flops 30 through 33 and flip-flops 26 through 29 to be complemented again.

At the completion of the operation, the binary number 1011 is stored in register No. 2, and registers No. 1, No. 3 and No. 4 contain the same binary signals that were stored therein before the operation was begun.

The flip-flops shown in block form in the drawing may be of the type shown in FIG. 21 of copending patent application Serial Number 494,982, entitled "Magnetic Data Storage," filed March 17, 1955, by Robert R. Everett et al.

The gates shown in block form in the drawing may be of the type shown in FIG. 46 of copending application Serial Number 471,002, entitled "Electronic Data Processing Machine," filed November 24, 1954, by Harold D. Ross et al.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a binary signal storage system comprising a plurality of binary signal storage registers, each register having a clear input and a complement input, the combination of selecting apparatus comprising: input means to apply signals to be stored to the complement input of each of said plurality of binary signal storage registers, clearing means to selectively apply a signal to the clear input of said plurality of binary signal storage registers and means to operate said input means, operate said clearing means, and re-operate said signal means in sequence.

2. In a binary signal storage system comprising a plurality of binary signal storage registers, each register including a plurality of bistable devices, each of said bistable devices including means responsive to a first signal input for causing said bistable device to assume a first predetermined stable state and responsive to a second signal input for causing said bistable device to assume a stable state opposite to its existing stable state, the combination of selecting apparatus comprising: input means to simultaneously apply signals representative of information to be stored to said second input of corresponding ones of said bistable devices of each register, clearing means to apply a signal to said first signal input of said bistable devices of a selected one of said registers and means to operate said input means, operate said clearing means, and re-operate said signal means in sequence.

3. In a signal storage system comprising a plurality of signal storage registers, each register including a plurality of bistable circuits, each of said bistable circuits having a complement input and a clear input, the combination of selecting apparatus comprising: input means to apply a pulse to said complement input of corresponding ones of said bistable circuits in each of said registers, clearing means to selectively apply a pulse to said clear input of said bistable circuits of one of said registers and means to operate said input means, operate said clearing means, and re-operate said signal means in sequence.

4. In a signal storage system comprising $n$ number of signal storage registers, each signal storage register having $m$ number of bistable circuits, each bistable circuit having a complement input and a clear input, and a data register having $m$ number of stages, the combination of selecting apparatus comprising: input means to apply signals stored in each of said data register stages to the complement input of all corresponding signal storage register bistable circuits, and clearing means to apply a clear signal to all of the bistable circuits of a selected register said input means being thereafter re-operative to re-apply signals stored in each of said data register stages to the complement input of all corresponding signal storage register bistable cricuits.

5. In a signal storage system comprising a plurality of signal storage registers, each signal storage register having a plurality of bistable circuits, each bistable circuit having a complement input and a clear input, the combination of selecting apparatus comprising: input means to first apply signals to be stored to the complement input of corresponding ones of said bistable circuits in each of said signal storage registers, clearing means to then apply a clear signal to the clear input of all bistable circuits of a selected one of said signal storage registers, said input means being re-operative to again apply said signals to be stored to the complement input of said corresponding ones of said bistable circuits in each of said signal storage registers.

6. In a signal storage system comprising $n$ number of signal storage registers, each signal storage register having $m$ number of pulse responsive bistable devices, each bistable device having a complement input and a clear input, the combination of selecting apparatus comprising: $m$ number of gate circuits, each gate circuit having a first and a second input and capable of producing a pulse output in response to a pulse applied to its first input provided that a signal is simultaneously received at its second input, means to connect the output of each gate circuit to its corresponding bistable device of each of said signal storage registers, means to apply signals representative of a binary number to said second inputs of said gate circuits and means to apply a first pulse to said first input of each of said gate circuits, to then apply a signal to the clear input of all of said bistable devices of a selected signal storage register and then to apply a second pulse to said first input of each of said gate circuits.

References Cited in the file of this patent

UNITED STATES PATENTS

| | | |
|---|---|---|
| 2,666,575 | Edwards | Jan. 19, 1954 |
| 2,673,337 | Avery | Mar. 23, 1954 |
| 2,685,653 | Orr et al. | Aug. 3, 1954 |
| 2,729,808 | Auerbach | Jan. 3, 1956 |

OTHER REFERENCES

"An Electronic Digital Computer" by A. D. Booth, Electronic Engineering, December 1950, pp. 492–498.